June 21, 1960  N. E. HANDEL  2,942,113
MEASURING SYSTEM
Filed March 18, 1958

INVENTOR
Neil E. Handel
Anthony D. Cennamo

United States Patent Office 2,942,113
Patented June 21, 1960

2,942,113

MEASURING SYSTEM

Neil E. Handel, Columbus, Ohio, assignor to Industrial Nucleonics Corporation, a corporation of Ohio Filed Mar. 18, 1958, Ser. No. 722,259

5 Claims. (Cl. 250—83.6)

This invention relates generally to radiation detector methods and systems and more particularly to radiation methods and systems employed to gauge material density or thickness and related operations employing a source of radioactive energy which exhibits a decay characteristic.

Many arrangements are now in use employing a source of radioactive energy and a detector for that energy for conducting measurements of various types and controlling industrial operations. Whenever such measurements or control processes are employed, the apparatus used is initially calibrated and adjusted to provide initial operating conditions which can be interpreted with respect to the measurements made to give quantitative information or control signals. In all such systems a factor which changes the measured or control quantities results from the radioactive decay of the source material in accordance with the half-life formula to the particular source material used. To eliminate this variable, frequent standardization or automatic standardization is employed in processes which are capable of removing a measured material from the space between the source and the detector for the purposes of calibration. Other arrangements are known wherein a duplication of the source and detector apparatus is employed, one being a standard and the other a measuring system with the measurements made by both systems combined in such a way as to compensate for changes in the intensity of the source or sensitivity of the detector.

These prior art arrangements are subject to limitations, particularly in the case where a process cannot be interrupted to remove the measured material from the space between the source and the detector. In the case of systems employing a measuring and a standard or reference system in combination, duplication is involved which is expensive, cumbersome and subject to other objections.

It is an object of this invention to provide improved method and apparatus for automatic compensation of source intensity decay in radiation gauges.

Another object of this invention is to provide compensation for source decay in a manner which overcomes the objections of the prior art.

A further object of this invention is to provide compensation for the decay in intensity of radioactive material by means of a time program compensation introduced into the system.

These and other objects will be apparent from the following detailed description taken in conjunction with the accompanying drawings wherein.

In accordance with a preferred embodiment of this invention a variable voltage is introduced into the measuring system which changes in accordance with time by an amount which compensates for the changes in the intensity of the radioactive source due to decay of the source material.

Figure 1:
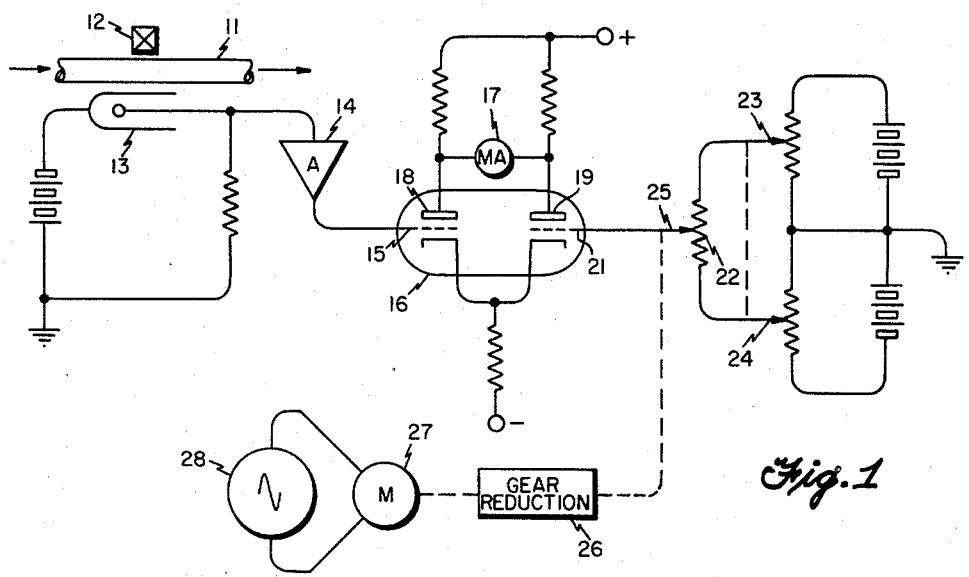
Fig. 1 shows a simple radiation measuring system employing time controlled compensation in accordance with the invention.

Referring now to Fig. 1, a system is shown for measuring the density of fluid flowing through a pipe 11 using a source of radioactive material 12 directed through the pipe 11 upon a radiation detector 13 which may be of the ionization chamber type.

Any well known circuit arrangement for the detector 13 is employed to derive signals representative of the intensity of the radiation from the source 12 falling on the detector 13. Signals from the chamber 13 may be applied through an electrometer or other type amplifier 14 as is known in the art and the output of the amplifier 14 is applied to a measuring circuit such as input grid 15 of amplifier 16. The amplifier 16 comprises a pair of triodes connected in a well known voltage measuring arrangement with the voltage variations applied to grid 15 indicated on a milliammeter 17 connected between plates 18, 19 of the tube 16.

For conventional indicators the tube 16 would be connected with the grid 21 connected to a constant source of reference potential against which the signals at grid 15 are differentially indicated by the meter 17. In accordance with the principles of the present invention the grid 21 may be connected to a potentiometer 22 which may be supplied from an adjustable voltage reference source by potentiometer connections 23, 24. The potentiometer 22 has a movable arm 25 which is driven at a constant rate by a gear reduction device 26, which in turn is driven at a constant speed from a motor 27, which may be a synchronous motor connected to an alternating current power source 28.

In accordance with the present invention the motor 27, the gear reduction 26, and the taper on the resistance winding 22 are chosen such that the voltage appearing at the movable contact 25 varies as a function of time in accordance with the decay characteristic of the radioactive source 12. Depending upon the interval of time between which the apparatus will be calibrated, the arrangement may comprise merely a constant speed drive derived from the motor 27 and the gear reduction 26 for a standard taper employed on the potentiometer 22. For more accurate control in long term stability applications, the taper on potentiometer 22 may be especially formed to provide a voltage variation at the movable contact 25 which precisely duplicates the rate of decay of the source 12. For either application the initial voltages of the potentiometer voltage source 23, 24 may be selected in combination with the initial position of the movable contact 25 to provide an exact fit to the decay characteristic.

Figure 2:
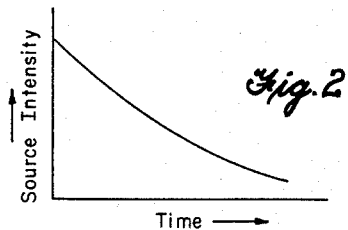
Fig. 2 is a decay characteristic curve.

As is well known in connection with radioactive materials, a half-life is known or may be readily determined for any particular source. In Fig. 2 a curve indicating the exponential decay in source intensity as a function of time is shown. Since the decay is exponential, the rate of decay may be predicted over a period of time and the control voltage introduced in accordance with this invention tailored accordingly.

Figure 3:
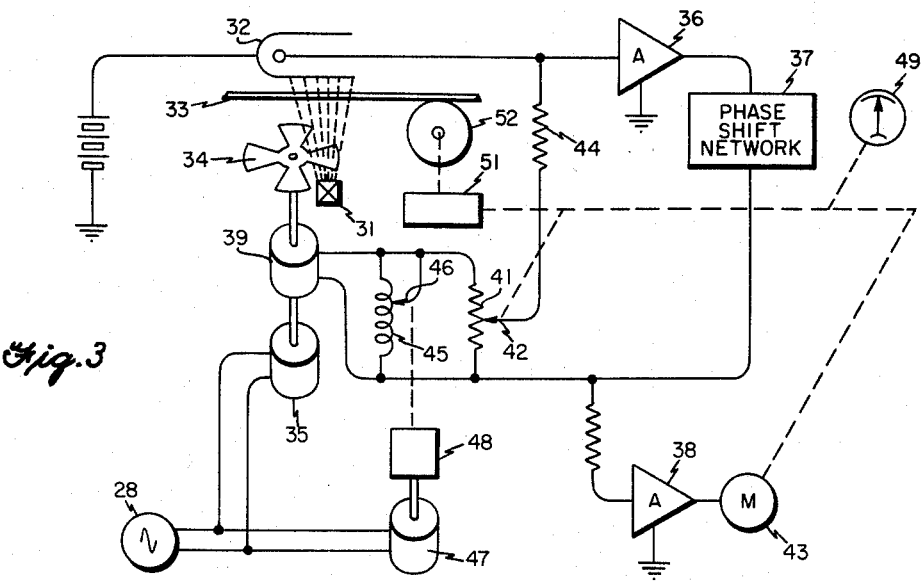
Fig. 3 is a schematic representation of an alternating current feedback measuring system.

Referring now to Fig. 3 a measurement and control system is shown in accordance with the preferred embodiment of the invention. The system shown in Fig. 3 is generally similar to the system disclosed and claimed in the patent to Chope, No. 2,790,945, assigned to the same assignee as the present invention. Since this general arrangement is described in detail in the aforementioned patent, it will be only briefly described herein. The system generally comprises a source 31 and a detector 32 arranged on opposite sides of material 33 which is being gauged. The beam from the source 31 is periodically interrupted by a chopper 34 rotated at constant speed by a synchronous motor 35. This arrangement produces an alternating signal from the detector 32 which is amplified by an A.C. amplifier 36, the output of which is passed through a phase shift network 37 and applied to a servo amplifier 38. The output of the phase shift network 37 is combined with an alternating voltage from a synchronous generator 39 which is rotated by the same shaft which turns chopper 34. By means of the phase shift network 37 the voltage supplied by the generator 39 and that derived from the phase shift network 37 are adjusted to be 180° out of phase and are applied to opposite ends of a potentiometer 41. In accordance with the teaching of the Chope patent the movable contact 42 for the potentiometer 41 is positioned by a motor 43 controlled by the servo amplifier 38. The contact 42 is connected through a feedback resistor 44 to the input of the amplifier 36. In accordance with well known servo control techniques the motor 43 positions the contact 42 to a null position in accordance with the input signal to the amplifier 36 derived from the detector 32.

To compensate for the decay characteristics of the source 31 the present invention applies the output of generator 39 across an adjustable autotransformer 45 which has a variable magnitude alternating voltage available at the adjustable brush 46. The magnitude of voltage from generator 39 which is applied to the potentiometer 41 is determined by the setting of the brush 46. The setting of brush 46 is controlled by a constant speed device such as a synchronous motor 47 driving a suitable gear reduction 48 to move the brush 46 in accordance with the predetermined time schedule. The rate at which the drive 47, 48 moves the brush 46 to vary the alternating voltage applied to potentiometer 41 is selected to correspond to the rate of the decay in intensity of the radiation emanating from the source 31.

The operation of the present invention will now be apparent to those skilled in the art in the light of the above teaching. The circuit of Fig. 3, for example, will operate in accordance with the teachings of the aforementioned Chope patent to measure the density per unit area of the material 33 passing through the beam of radiation from the source 31. As is well known, the absorption of the radiation will be in accordance with the density (mass per unit volume) of the material or, in the case of constant density material, in accordance with the thickness of the material in the path of the radiation. The term "density" in this application is defined as generic to both types of variation. This measurement may be indicated on a meter 49 connected to the servo motor 43. As the gauging operation is conducted over extended periods of time and the source 31 decays with the resultant recrease in intensity emanating therefrom, the tendency for the measurement apparatus to indicate greater absorption by the material 33 is overcome by the change in voltage applied to the potentiometer 41 by the time driven brush 46. Depending upon the application involved, the accuracy with which this compensation is achieved can be controlled selecting the rate of drive of the brush 46 by the drive elements 47, 48 or controlling the taper of the turns of the winding on the transformer 45 to produce the desired characteristic.

The decay compensation system of the present invention can be readily applied to control systems as well as measurement systems and for this purpose in Fig. 3 a controller 51 is connected to the output of servo motor 43 to control the industrial process being monitored in response to the setting of the motor 43 in the servo system. For this purpose the controller 51 may be subjected to any suitable process control device such as rollers 52 for rolling sheet material 33 as illustrated in the particular embodiment disclosed.

Many modifications and applications of the present invention to a wide range of industrial and commercial processes will be apparent in the light of the above teachings and are to be considered as being within the scope of the invention as defined in the appended claims.

What is claimed is:

1. A material density gauge comprising a radioactive source of radiation having a predetermined intensity decay characteristic, an ionizable detector tube for said radiation, means for disposing said source and said detector on opposite sides of said material with said radiation directed toward said detector, means for generating a voltage analogue of said decay characteristic, a differential voltmeter, and means for applying detected signals from said tube and said voltage analogue to said voltmeter to compensate for the effect of said decay characteristic on the indication of said detected signals.

2. In an apparatus for gauging the value of a condition, a radioactive source of radiation having a predetermined intensity decay characteristic, means for quantitatively detecting a portion of said radiation modified by said condition-value to provide an electrical signal indicative of said value, means for generating an electrical analog of said decay characteristic, means for combining said signal and said analog and means for indicating the result of said combination.

3. The combination of claim 2 wherein said analog generating means comprises a voltage source, means for adjusting the output of said voltage source and a clock motor for driving said adjusting means.

4. The combination of claim 3 wherein said output adjusting means comprises a non-linear element for generating a function approximating the time-intensity characteristic of the decay of said radioactive source.

5. Apparatus for gauging the density of material comprising a radioactive source of radiation having a predetermined intensity decay characteristic, means for directing said radiation on said material, means for detecting said radiation to obtain an output signal modified by the absorption of said material, means for generating a time variant signal corresponding to said decay characteristic, said time variant signal generating means comprising a voltage source, a time clock, and means driven by said time clock for adjusting the voltage output of said voltage source to provide said time variant signal, a utilization device, and means for combining the effect of said output signal and said time variant signal in said utilization device to eliminate the effect on said utilization device of said decay characteristic.

References Cited in the file of this patent

UNITED STATES PATENTS

| | | |
|---|---|---|
| 2,675,483 | Leighton | Apr. 13, 1954 |
| 2,790,945 | Chope | Apr. 30, 1957 |
| 2,829,268 | Chope | Apr. 1, 1958 |

FOREIGN PATENTS

| | | |
|---|---|---|
| 203,317 | Australia | June 30, 1955 |